Nov. 7, 1961 P. P. WUESTHOFF 3,007,428
WORK SUPPORTING AND ROTATING APPARATUS
Filed April 16, 1958 2 Sheets-Sheet 1

INVENTOR.
PAUL P. WUESTHOFF
BY Cohn and Powell
ATTORNEYS

Nov. 7, 1961 P. P. WUESTHOFF 3,007,428
WORK SUPPORTING AND ROTATING APPARATUS
Filed April 16, 1958 2 Sheets-Sheet 2

INVENTOR.
PAUL P. WUESTHOFF
BY Cohn and Powell
ATTORNEYS

United States Patent Office 3,007,428
Patented Nov. 7, 1961

3,007,428
WORK SUPPORTING AND ROTATING
APPARATUS
Paul P. Wuesthoff, St. Louis, Mo., assignor to Pandjiris Weldment Co., St. Louis, Mo., a corporation of Missouri
Filed Apr. 16, 1958, Ser. No. 728,827
3 Claims. (Cl. 113—130)

This invention relates generally to improvements in a work supporting and rotating apparatus, and more particularly to an improved apparatus of this type adapted to support and rotate cylindrical tanks during welding of annular seams.

Heretofore in powered turning roll assemblies utilized for this purpose, a single electric motor was used to drive a pair of wheel units, the motor being fixedly mounted on the floor or other supporting surface. In such assembly, a pair of wheel units were mounted on a base, and a gear speed reducer was connected to each wheel shaft. The stationary motor was connected by some conventional variable speed drive means to one of the speed reducers, and a cross shaft was connected between the speed reducers.

Of great importance, in order to change or adjust the position of the wheel units on the base to accommodate tanks of different diameters, the cross shaft between the speed reducers had to be removed and another cross shaft of correct length inserted, depending on the distance between the wheel units. Furthermore, only one wheel unit could be conveniently adjusted on the base; otherwise a change would be required not only in the length of cross shaft between speed reducers but also in the drive connection to the one wheel shaft speed reducer from the stationary motor. In addition, it is seen that when only one wheel unit was adjustably moved to another position, the center line or rotative axis of the work piece was shifted which could effect the positioning of the welding apparatus or other equipment utilized with the turning roll assembly.

It is an important objective of the present invention to provide a work supporting and rotative apparatus in which each turning roll unit is detachably mounted on the base for adjustable movement toward or away from the other, and in which each unit has its own electric motor mounted on and carried by the platform that carries the wheel means, the electric motor of each unit being drivingly connected to the shaft of the wheel means of the same unit.

An important object of the above described improved apparatus eliminates any cross shaft between the turning roll units.

Another important object is realized in that the turning roll units can be quickly and easily adjusted to different positions on the base to accommodate different tank diameters within a predetermined range, all without requiring any change in the drive connection between the motor and the wheel means, and without requiring the replacement of different cross shafts between units.

Still another important object is achieved in that the turning roll units can be readily and conveniently adjusted to different relative positions without shifting the rotative axis of the work piece if it is desired to maintain the position of such axis, all without requiring any replacement or substitution of additional parts, and without requiring any change in the drive connection of the motor.

Yet another important objective is to provide an apparatus that is simple and durable in construction, relatively inexpensive to manufacture, efficient in operation, and which can be readily adjusted for adaptation to support and rotate work pieces within a wide range of diameters.

The foregoing and numerous other objects and advantages of the invention will more clearly appear from the following detailed description of a preferred embodiment, particularly when considered in connection with the accompanying drawings, in which.

Figure 1:
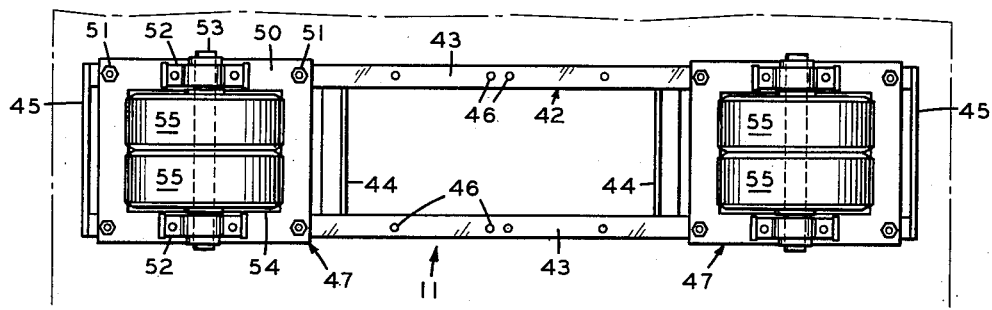
FIG. 1 is a top plan view of the work supporting and rotating apparatus, the dashed lines indicating a fragmentary portion of a cylindrical tank.

Referring now by characters of reference to the drawings, and first to FIG. 1, it is seen that the apparatus includes a powered turning roll assembly generally indicated at 10 and an idler turning roll assembly referred to at 11.

The powered turning roll assembly 10 includes a base 12 constructed of a pair of channel members 13 arranged in spaced parallel relation. Disposed between channel members 13 are a plurality of angle members 14 which constitute cross braces. The ends of base 12 are enclosed by plates 15. The channel members 13 constitute rails forming a track, the rails being provided with a plurality of bolt apertures 16 arranged in predetermined positions to accommodate adaptation of the apparatus for different size tanks in a manner subsequently described.

A pair of turning roll units referred to at 17 are mounted on base 12. These units 17 are of identical construction so that a detailed description of one will serve the other.

Each turning roll unit 17 includes a platform 20 that is secured to rails 13 by a plurality of bolts 21, the bolts 21 located in bolt apertures 16. Mounted on opposite sides of platform 20 is a pair of pillow blocks 22 adapted to journal a wheel shaft 23, the rotative axis of wheel shaft 23 is disposed in parallel relation to the rotative axis of the supported work piece indicated at 24.

A pair of wheels 25 constituting wheel means are attached to shaft 23, the wheels 25 extending through a central opening 26 formed in platform 20, and extending between channel members 13 of base 12.

Each platform 20 is provided with an attached platform housing portion 27 that extends forwardly beyond one of the rails 13. Mounted in each platform housing portion 27 is an electric motor 30. A drive means located within the platform housing portion 27 operatively interconnects the motor 30 with the wheel shaft 23. This drive means includes a belt and pulley structure 31 interconnecting the motor 30 with a gear speed-reducer 32. A sprocket and chain structure 33 operatively interconnects the reducer 32 with a gear speed-reducer 34 carried on wheel shaft 23.

Figure 3:
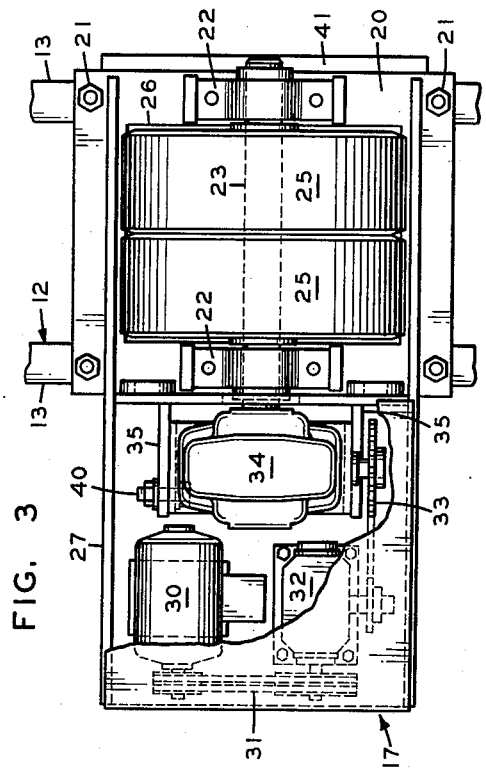
FIG. 3 is an enlarged top plan view of one turning roll unit, partially broken away to illustrate more clearly the structure and mounting of the motor and drive means.
Figure 4:
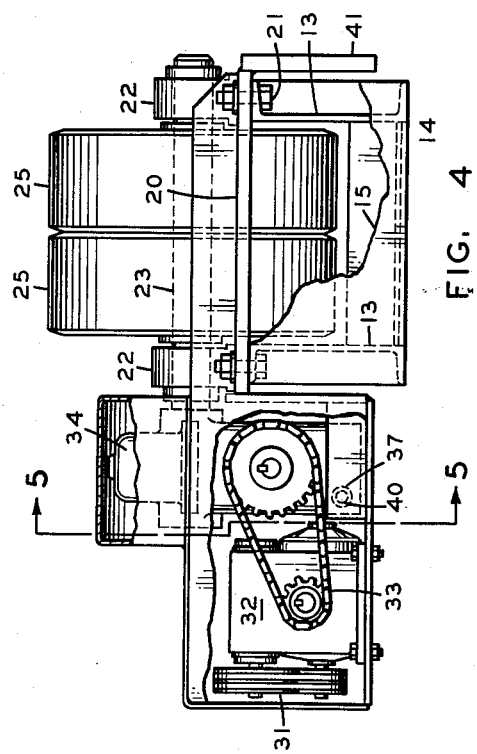
FIG. 4 is a side elevational view of the powered turning roll assembly, with the base partially broken away to illustrate the base construction, and with the powered unit housing partially broken away to illustrate the mounting and connection of the motor and drive means.
Figure 5:
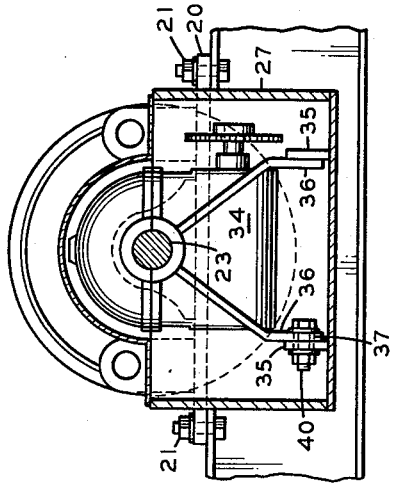
FIG. 5 is a view partially in cross section, as seen along line 5—5 of FIG. 4.

As is best seen in FIGS. 3, 4 and 5, the gears of speed reducer 34 are drivingly connected to wheel shaft 23, and that the reducer 34 is actually supported and carried by wheel shaft 23. In order to avoid the utilization of a flexible coupling between the speed-reducer 34 and wheel shaft 23, an adjustable connection is provided between the housing of reducer 34 and the platform housing portion 27. For example, as best seen in FIG. 5, the platform housing portion 27 is provided with upstanding lugs 35 between which arm portions 36 forming an integral part of the housing of reducer 34 are located. An elongate slot 37 is provided in each lug 35 through which a bolt 40 extends.

In assembling the speed-reducer 34, the gearing of the reducer 34 is directly connected to the end of wheel shaft 23 and the housing thereby supported by shaft 23. In order to preclude the reducer 34 from rotating, the housing must be fixed. When the reducer 34 is properly located on shaft 23, the arms 36 are located between lugs 35. Bolts 40 are used to clamp the arms 36 to lugs 35. It will be seen that the elongate slots 37 through which the bolts 40 extend enable positive connection to the platform housing portion 27 and yet provide positive alignment of the reducer 34 with the wheel shaft 23.

A plate 41 is attached to platform 20, the plate 41 constituting a counterbalance means extending beyond the other rail 13 opposite from the projecting platform housing portion 27.

The idler roll assembly 11 includes a base 42 constructed identically with the base 12 previously described. For example, the base 42 includes spaced parallel channel rails 43 with interconnecting angle cross braces 44, and with enclosing end plates 45. A plurality of bolt apertures 46 are provided in channel rails 43.

A pair of idler wheel units referred to at 47 are detachably mounted on base 42. These wheel units 47 are of identical construction, and hence a detailed description of one will serve for the other.

Each idler wheel unit 47 includes a platform 50 detachably mounted on channel rails 43 by a plurality of bolts 51 extending through bolt apertures 46. Pillow blocks 52 are attached at opposite sides of the platform 50, the pillow blocks 52 journalling an idler wheel shaft 53. The platform 50 is provided with a relatively large opening 54 located between the pillow blocks 52 and between the channel rails 43 when the platform 50 is attached to the base 42. A pair of idler wheels 55 constituting wheel means are attached to wheel shaft 53, the wheels 55 extending through platform opening 54 and extending between channel rails 43.

The preferred form of control system for regulating and balancing the speed of drive wheel means 25 consists basically of an integral combination of a pair of A.C. constant speed induction motors 30 having an eddy-current coupling, and an electronic speed control. This type of control unit is manufactured and sold by the Dynamatic Division of Eaton Manufacturing Co. of Kenosha, Wisconsin.

Figure 6:
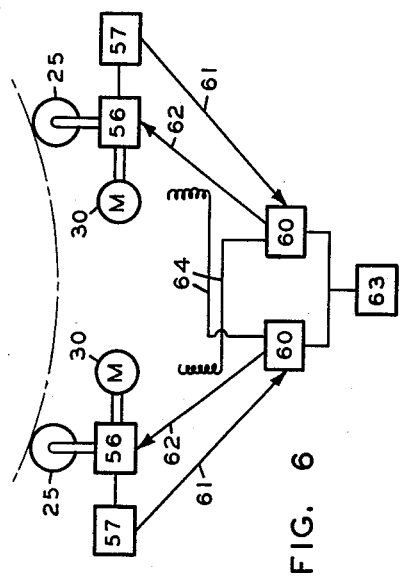
FIG. 6 is a diagrammatic view of the turning roll assembly together with its control system.

The control system is shown diagrammatically in FIG. 6 of the drawing. For example, the motor 30 (FIG. 6) is operatively connected to a magnetic coupling 56, and hence by the drive connection 31–34 to the drive wheel means 25. A tachometer generator 57 needed to supply a speed-sensing signal to the electronic speed control, has its rotor keyed to the output shaft.

A speed differential, or slip, between two concentric rotating elements, drum and field, produces the torque transmitting forces in the eddy-current coupling 56. When the coupling drum assembly is rotated by the squirrel cage induction motor 30, the field assembly remains stationary until voltage is applied to the clutch coil. Energization of the coil produces magnetic flux in the field and the drum rings.

As the drum rotates relative to the poles of the field, eddy-currents are generated in the drum. These currents form a pattern of magnetic poles on the inner surface of the drum. Magnetic attraction between the poles of the field and the poles generated in the drum cause the development of torque. Consequently the field follows drum in rotation.

Varying the excitation to the field coils, changes the magnetic field strength, which in turn proportionately effects the torque developed. To maintain constant speed the torque of the magnetic coupling 56 must be constantly modulated to match the torque demanded by the load. Too little torque will allow the speed to decrease. Too much torque will increase the speed. Electronic speed control provided with these units automatically performs the modulating function.

The speed control is accomplished by means of a stable feed-back system comparable to that used in large, closely controlled, adjustable speed drives. These speed control stations 60 include Thyratron tubes that are utilized as control rectifiers to provide D.C. excitation for the coupling field. The tachometer generator output voltage is proportional to generator speed. This voltage is rectified and applied to the Thyratron grid circuit to maintain a governed speed point anywhere within the range of the drive.

For example, the arrow 61 represents the signal fed from the tachometer generator 57 to the speed control 60, and arrow 62 represents the feed-back signal transmitted to the clutch field of the magnetic coupling 56.

Both speed control stations 60 are subjected to the same reference voltage 63 which determines the speed of rotation of wheels 25.

Load sharing is accomplished by cross feed back from excitation power of one unit to the speed control of the other unit. For example, the feed back from the power supply to one station influences the power supply of the other station as represented diagrammatically by circuit lines 64, so that if the load on one unit is more than the load on the other unit then the last said unit is "forced." Thus, the loads are balanced.

Of course, other control systems may be utilized. For example, a pair of D.C. motors 30 electrically connected with their armatures in parallel and adapted to receive their voltage from a common supply source, may be used. Balancing of the load in this system is accomplished by means of series fields.

It is thought that the operation and functional advantages of the work supporting and rotating apparatus has become fully apparent from the foregoing detailed description, but for completeness of disclosure, adjustment of the turning roll units 17 and the idler roll units 47 will be further described.

Figure 2:
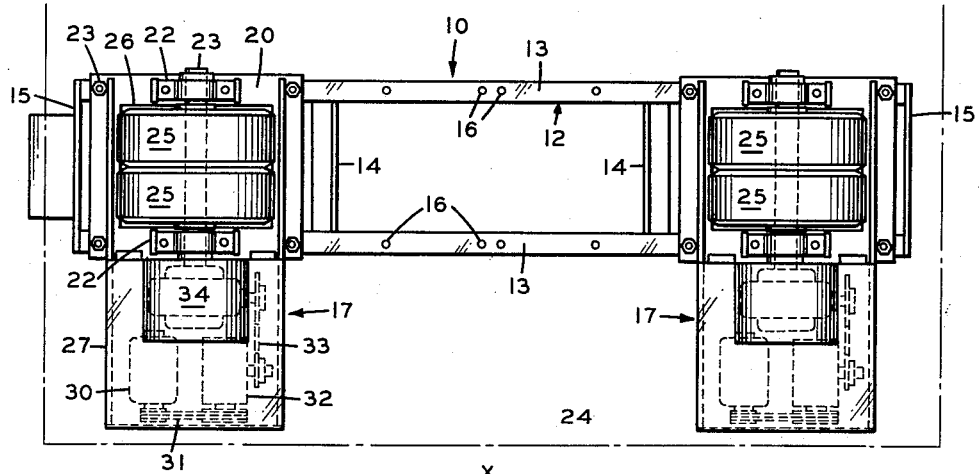
FIG. 2 is a front elevational view of the powered turning roll assembly of the apparatus, this view indicating in dashed lines different positions of the turning roll units to accommodate tanks of different sizes.
Figure 2:
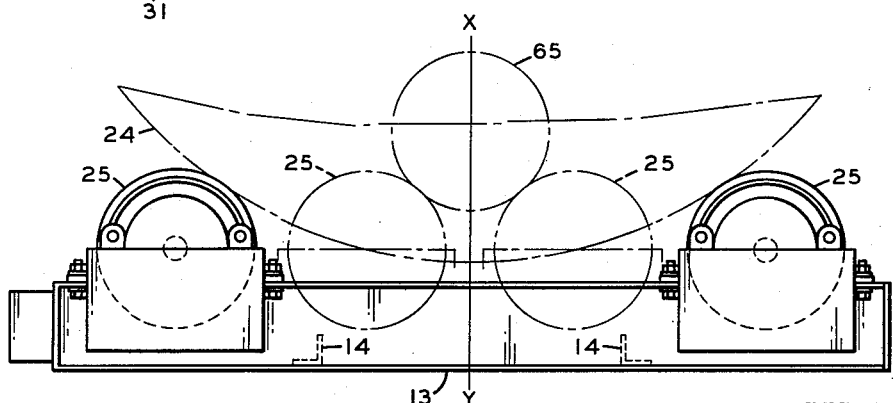

Assuming the position of turning roll unit 17 as shown in FIG. 1 and in full lines in FIG. 2, the apparatus is adapted to support and rotate a cylindrical tank 24 having the diameter illustrated. If it is desired to adapt the apparatus for supporting and rotating a cylindrical tank having a smaller diameter, as for example, the diameter of a tank illustrated by reference numeral 65 in FIG. 2, the turning roll units 17 and idler roll units 47 must be adjusted to new positions on their respective bases 12 and 42. In order to position adjustably turning roll units 17, the bolts 21 are unfastened and the units 17 as a whole are moved to an adjusted position on rails 13 as is illustrated by dashed lines in FIG. 2. The bolts 21 are reinserted through platforms 20 and reconnected to the channel rails 13 to retain the turning roll units in adjusted position.

It will be particularly noted that in moving the powered turning roll units 17 to new positions on the base 12, that such adjustment is accomplished merely by unfastening bolts 21 and moving the units including motor 30—drive means 31–34—wheels 25 to the new position, and then refastening bolts 21. Because each unit 17 has its own motor and drive connection, there is no necessity for changing the drive connection or for replacing any parts in such drive connection.

The idler roll units 47 are moved to aligned positions on base 42 by merely removing bolts 51, moving platforms 50 and the wheels 55 mounted thereon to the new positions, and then refastening bolts 51.

Although the invention has been described by making detailed reference to a single preferred embodiment, such detail is to be understood in an instructive, rather than in any restrictive sense, many variants being possible within the scope of the claims hereunto appended.

I claim as my invention:

1. In a work supporting and rotating apparatus, a base having spaced rails, a pair of turning roll units each including a platform bridging said rails, means detachably fastening said platform to said base, wheel means located between said rails and rotatively mounted on said platform, the wheel means of the pair of units being disposed with their rotative axes in parallel relation, each platform having a portion overhanging the same side of the base, an electric motor mounted on and carried by each overhanging platform portion, and a drive means carried by each said overhanging platform portion interconnecting the motor carried by each respective platform to the wheel means mounted on the same platform, each unit of wheel means-motor-drive connection being adjustably positioned on the base by the detachable connection of the platform to the rails.

2. The combination and arrangement of elements as recited above in claim 1, but further characterized in that each said drive means includes a gear speed-reducer operatively connected to and carried by the shaft of the wheel means, the speed reducer having a housing, and an adjustable connection between the speed reducer housing and the platform on which the respective motor and wheel means are mounted providing positive connection of said housing and platform and yet providing positive alignment of the reducer with said wheel means shaft.

3. In a work supporting and rotating apparatus, a base having spaced substantially parallel rails constituting a track, a pair of turning roll units, each unit including a platform detachably mounted on said rails, a roll shaft mounted on each said platform, said shaft being disposed in parallel relation and in bridging relation to the rails, wheel means drivingly attached to said shaft and located between said rails, each platform having a portion extending beyond the same side of one rail, an electric motor attached to and carried by each overhanging platform portion, a drive means connecting the motor of each platform with the shaft on the same platform, an electrical circuit operatively connecting each said motor including control means for regulating and balancing the speed of said wheel means, an adjustable connection between said platform and said rail so that said units including motor-wheel means-drive means are adjustably positioned toward or away from each other by changing such connections, and a counterbalance means attached to each said platform and extending beyond the side of the other rail opposite from the overhanging platform portion to counterbalance the said overhanging platform portion.

References Cited in the file of this patent

UNITED STATES PATENTS

| 573,783 | Groves | Dec. 22, 1896 |

FOREIGN PATENTS

| 509,845 | Canada | Feb. 8, 1955 |
| 738,326 | Great Britain | Oct. 12, 1955 |